United States Patent
Do et al.

(10) Patent No.: US 6,809,890 B2
(45) Date of Patent: Oct. 26, 2004

(54) METHOD FOR MANUFACTURING SILICON WAFER AND SILICON WAFER

(75) Inventors: Satoshi Do, Fuchuu (JP); Isao Onuma, Fuchuu (JP)

(73) Assignee: Milestone Co., Ltd., Tokyo (JP)

( * ) Notice: Subject to any disclaimer, the term of this patent is extended or adjusted under 35 U.S.C. 154(b) by 255 days.

(21) Appl. No.: 10/158,166

(22) Filed: May 31, 2002

(65) Prior Publication Data

US 2003/0081330 A1 May 1, 2003

(30) Foreign Application Priority Data

Oct. 12, 2001 (JP) ........................................ 2001-315016

(51) Int. Cl.$^7$ ................................................. G02B 9/04
(52) U.S. Cl. ........................ 359/793; 359/794; 359/795
(58) Field of Search ................................. 359/793, 794, 359/795, 754

(56) References Cited

U.S. PATENT DOCUMENTS

| | | | |
|---|---|---|---|
| 4,858,002 A | 8/1989 | Zobel | |
| 5,729,389 A | 3/1998 | Nagaoka | |
| 5,909,322 A | 6/1999 | Bietry | |
| 5,999,334 A | 12/1999 | Kohno | |
| 6,011,660 A | * 1/2000 | Nagahara | 359/793 |
| 6,067,196 A | 5/2000 | Yamamoto et al. | |
| 6,449,105 B1 | * 9/2002 | Dou | 359/793 |

FOREIGN PATENT DOCUMENTS

| | | |
|---|---|---|
| JP | 03075712 | 3/1991 |
| JP | 06043361 | 2/1994 |
| JP | 06067089 | 3/1994 |
| JP | 09197273 | 7/1997 |
| JP | 10104511 | 4/1998 |
| JP | 10206726 | 8/1998 |
| JP | 10206730 | 8/1998 |
| JP | 2000089107 | 3/2000 |
| JP | 2000292696 | 10/2000 |

\* cited by examiner

*Primary Examiner*—Hung X. Dang
(74) *Attorney, Agent, or Firm*—Venable; James R. Burdett

(57) ABSTRACT

An imaging lens comprising, in sequence from the object side to the image side: an aperture diaphragm, a first lens, a second diaphragm, and a second lens; the first lens consisting of a meniscus-shaped lens having positive power with a concave face oriented towards the object side; the second lens consisting of a meniscus-shaped lens with a concave face oriented towards the image side; wherein at least one face of the first lens is an aspherical face, and one or more faces of the second lens is an aspherical face, in such a manner that the imaging lens as a whole is a lens system comprising at least two aspherical faces, and satisfying each of the following condition equations (1), (2), (3).

$$0.01 < |f_1|/|f_2| < 0.6 \tag{1}$$

$$0.3f < |R_2| < 0.6f \tag{2}$$

$$0.5f < D_0 < 1.5f \tag{3}$$

8 Claims, 9 Drawing Sheets

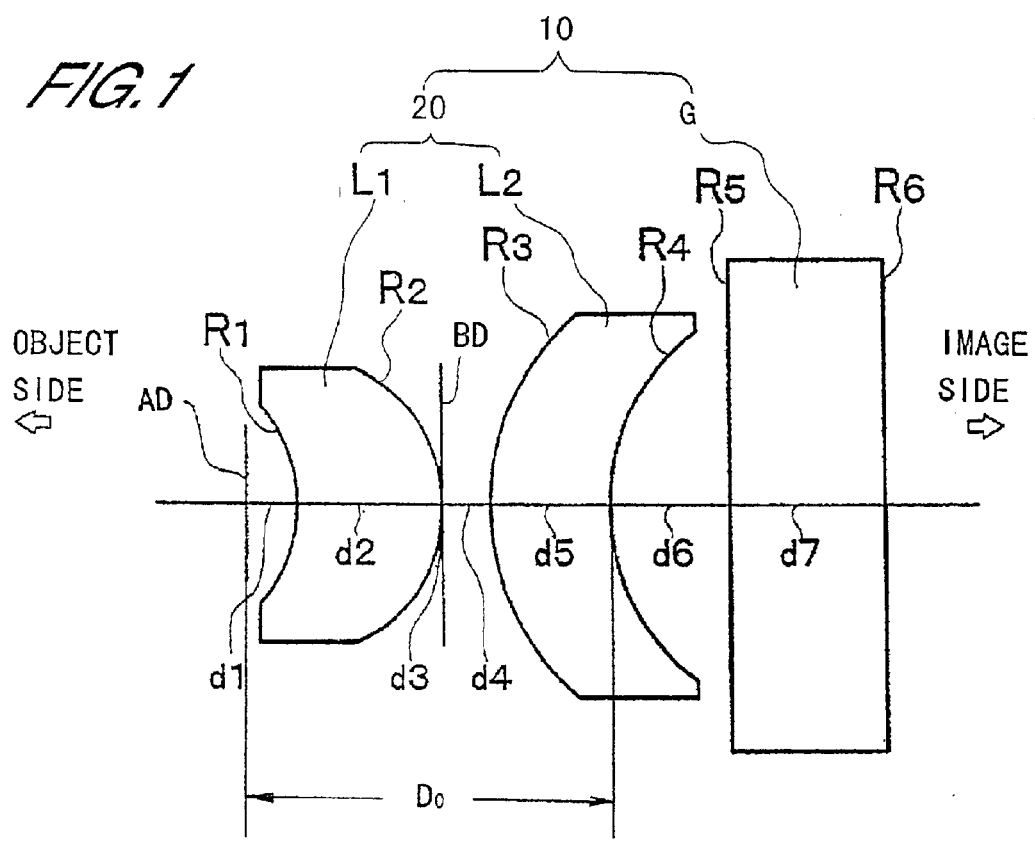

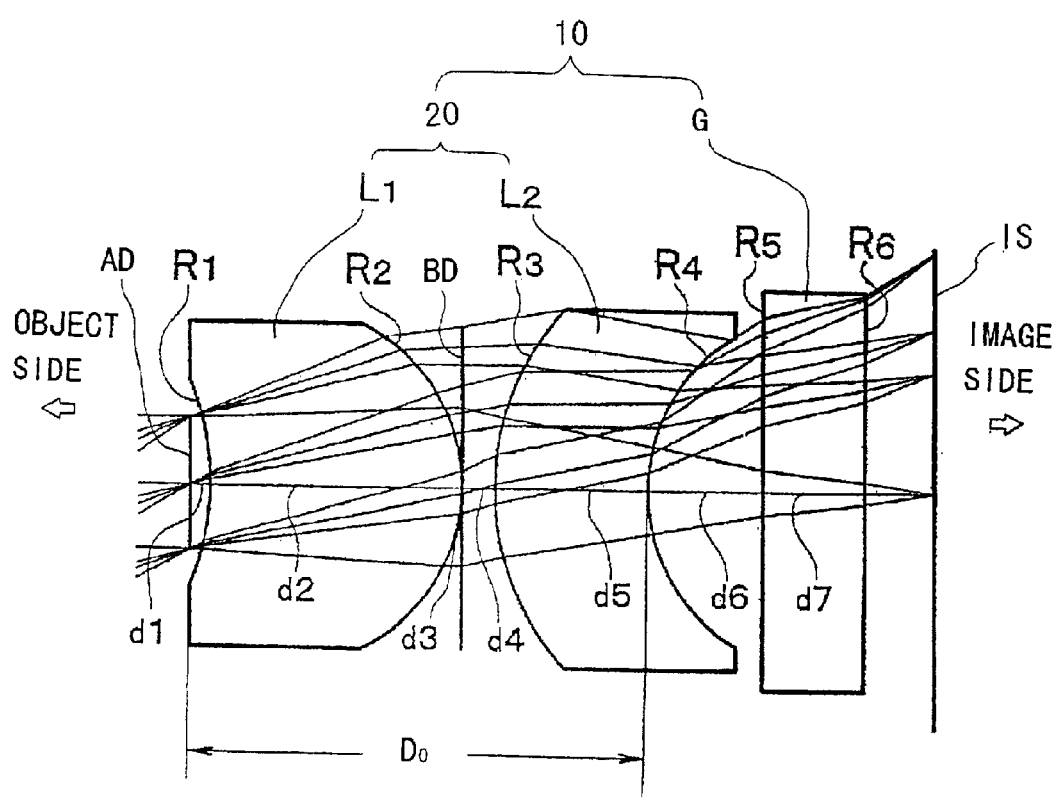

COMA

Fno 2.800
fl 2.053
DEFOCUS .000
IMAGE H
1.315
.920
.657
.000

0.2 (mm)
ASTIGMATISM

2.%
DISTORTION 0.2 (mm)
CHROMATIC AND SPHERICAL ABERRATION

```
Fno
   2.805
f l
   3.293
DEFOCUS
   .000
IMAGE H
   2.250
   1.575
   1.124
   .000
```

COMA

ASTIGMATISM

DISTORTION

CHROMATIC AND SPHERICAL ABERRATION

```
Fno
   2.805
fl
   2.960
DEFOCUS
   .000
IMAGE H
   2.251
   1.575
   1.125
    .000
```

ASTIGMATISM

DISTORTION

CHROMATIC AND SPHERICAL ABERRATION

COMA

Fno 2.800
fl 3.624
DEFOCUS
    .000
IMAGE H
    2.240
    1.792
    1.344
    .000

0.2 (mm)
ASTIGMATISM

2.%
DISTORTION 0.2 (mm)
CHROMATIC AND SPHERICAL ABERRATION

METHOD FOR MANUFACTURING SILICON WAFER AND SILICON WAFER

BACKGROUND OF THE INVENTION

1. Field of the Invention

The present invention relates to a monitor lens for a portable telephone, a monitor lens for a PDA or PC, and an imaging lens used in a television camera, or the like, using CCD and CMOS devices.

2. Description of Related Art

It has been proposed to use plastic lenses, and lenses permitting cost reduction and compactification, for imaging lenses for CCDs of this kind.

However, although it is certainly possible to achieve reduction in the number of lenses and size reductions, there have been observed lenses wherein, even if a shorter optical path is successfully achieved, the distortion aberration is increased, and the subject becomes distorted, or lenses wherein the outer diameter of the lens is increased, or the overall length is increased, in order to correct distortion aberration, or other aberrations, and hence compactification cannot be achieved.

In the future, cameras with imaging systems using CCD or CMOS devices, will become extremely small, and hence there will be demand for extremely short optical paths in the associated optical systems.

The prior art cannot be seen as providing compactification and satisfactorily contributing to aberration compensation in order to obtain suitable aberration corresponding to the compactification.

From here on, cameras using CCD and CMOS devices will become increasingly compactified, and optical lens systems used in miniature equipment, such as portable telephones, PDA equipment, and the like, will have shorter optical paths than lenses of this kind in the prior art, and furthermore, such lenses will not be usable unless distortion aberration is also corrected.

It is an object of the present invention to provide an extremely small imaging lens having a short optical path, low distortion aberration and high performance, which can be used in cameras, televisions, and the like, using CCD and CMOS devices, and comprises a small number of lenses, namely, a two-lens composition, whilst maintaining a luminosity of approximately f2.8.

It is a further object of the present invention to provide an imaging lens which achieves weight reduction by constituting all of the lens by means of plastic material.

SUMMARY OF THE INVENTION

In order to achieve the aforementioned objects, in the present invention, the lens system is constituted as described below (see FIG. 1).

Namely, the imaging lens according to the present invention comprises, in sequence from the object side to the image side: an aperture diaphragm, a meniscus-shaped first lens having positive power with a concave face oriented towards the object side, a diaphragm, and a meniscus-shaped second lens having a concave face oriented towards the image side, and hence the lens comprises a total of two lenses, namely, the first lens and the second lens.

In the present invention, by adopting a lens system wherein at least one face of the first lens is an aspherical face, and one or more faces of the second lens is an aspherical face, in such a manner that the imaging lens as a whole is a lens system comprising at least two aspherical faces, good aberration values are obtained, and furthermore, effective use of plastic can be used when employing plastic lenses.

In the present invention, in addition to the shape characteristics, the following compositional conditions, (1), (2) and (3) must be satisfied.

$$0.01 < |f_1|/|f_2| < 0.6 \tag{1}$$

$$0.3f < |R_2| < 0.6f \tag{2}$$

$$0.5f < D_0 < 1.5f \tag{3}$$

where f: focal length of whole lens $f_1$: focal length of first lens $f_2$: focal length of second lens $D_0$: distance from the aperture diaphragm face to the second face of second lens (total central length of lens)

$R_2$: radius of curvature of image side of first lens

In the present invention, the first and second lenses may both be made from glass or from resin.

Moreover, in the present invention, both faces of the first lens may be aspherical faces, and the second face of the second lens may be an aspherical face.

According to the present invention, a lens for a CCD or CMOS device is constituted by means of a small number of lenses, namely, a two-lens composition, and in order to achieve suitable brightness in a compact structure, aspherical faces are employed in at least two of the lens faces.

Condition (1) determines the power distribution of the first lens and second lens, and if the value of $|f_1|/|f_2|$ becomes less than the minimum limit in condition, then the power of the first lens will strengthen and the power of the second lens will weaken, and consequently, it will become difficult to correct spherical face aberration, coma aberration, and distortion aberration generated by the first lens.

Moreover, if the value of $|f_1|/|f_2|$ exceeds the maximum limit of condition (1), then the power of the first lens weakens, and in order to shorten the focal length (f) and back focus (bf), it is necessary to increase the power of the second lens, thereby making it more difficult to correct distortion aberration and coma aberration generated by the second lens, and hence a good image cannot be obtained.

Condition (2) ensures that a suitable optical length is obtained, whilst maintaining good aberration.

If the minimum limit is exceeded, then the radius of curvature of image side of the first lens will form a strongly convex face, meaning that spherical face aberration, coma aberration, and distortion aberration will increase, and it will be difficult to correct this aberration, even if an aspherical surface is adopted.

Moreover, in a lens having a short focal length (f), the radius of curvature will become too small and will become impossible to process.

If the upper limit is exceeded, then the radius of curvature of image side of the first lens forms a weak convex surface, and the power of the first lens will weaken, thereby making it difficult to adjust the correction of aberration in the first lens, the focal length (f), and the length of the optical path.

Even if R2 is formed as an aspherical face, it is difficult to correct aberration in this face, and ultimately, good images cannot be obtained.

Condition (3) stipulates the size of the lens system, whilst simultaneously maintaining the peripheral amount of light, and if the total length of the lens ($D_0$) is less than the lower limit of condition (3), then in the case of a meniscus-shaped lens, the Petzval sum will increase, which is undesirable.

Moreover, if the focal length is adjusted by reducing the radius of curvature of the second face (R2) of the first lens in order to lengthen the focal length of the whole lens system, then the spherical face aberration, coma aberration and distortion aberration will increase, and it will not be possible to obtain a good image.

If the total length of the lens ($D_O$) exceeds the maximum limit of the condition (3), then the lens as a whole will be long and the ratio of peripheral light will decline. In order to correct this, the external diameter of the second lens must be increased, but the increased overall length and external dimensions of the lens make it difficult to achieve compactification.

By means of the three conditions (1) to (3) above, a compact imaging lens having excellent properties is obtained.

Moreover, the first lens may be formed by a double-convex lens having positive power wherein both convex faces are oriented towards the object side. In this case, no diaphragm is provided between the first lens and the second lens. The remaining composition and conditions according to the present invention may be adopted in this case.

BRIEF DESCRIPTION OF THE DRAWINGS

The foregoing and other objects, features and advantages of the present invention will be better understood from the following description taken in connection with the accompanying drawings, in which:

FIG. 1 is a compositional diagram of an imaging lens according to the present invention;

FIG. 2(A) is an optical diagram and FIGS. 2(B) to 2(E) are aberration charts showing a first embodiment of an imaging lens according to the present invention;

DESCRIPTION OF THE PREFERRED EMBODIMENTS

Figure 2B:
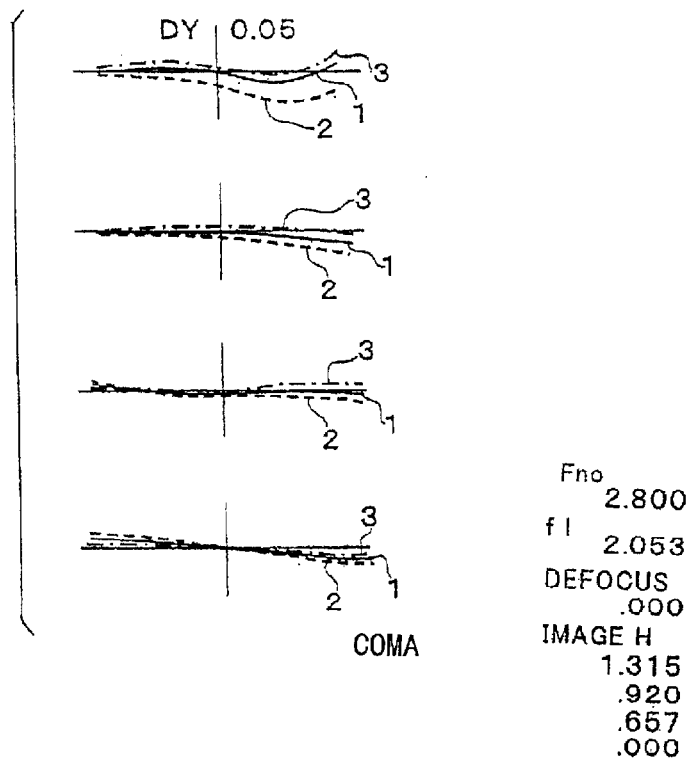

The inventions will be described hereinbelow with reference to the drawings showing respective embodiments. Incidentally, the drawings to be referred show merely schematic arrangement of the respective constituent elements on such a level that the inventions can be understood.

FIG. 1 is a compositional diagram of an imaging lens according to the present invention.

Table 1 to Table 4 show compositional data relating to a first embodiment to a fourth embodiment of the present invention.

TABLE 1

Compositional data (Embodiment 1)

| Radius of curvature (R1) | Interval (di) | Refractive index (ni) | Abbe's constant (vi) |
|---|---|---|---|
| Diaphragm 0.00 | d1 = 0.100 | | |
| R1 = −2.748 | d2 = 1.300 | n2 = 1.53 | v2 = 56 |
| R2 = −0.9533 | d3 = 0.000 | | |
| Diaphragm 0.00 | d4 = 0.150 | | |
| R3 = 1.389 | d5 = 0.800 | n5 = 1.53 | v5 = 56 |
| R4 = 0.88 | d6 = 0.600 | | |
| R5 = 0.00 | d7 = 0.500 | n7 = 1.52 | Cover glass |
| R6 = 0.00 | | | |

Paraxial data

Combined focal length f = 2.053 mm
Fno (numerical aperture) = 2.8

Aspherical surface coefficients

| R1 | K = 0.2168e + 2 | A = 0.1229 | B = −0.907 | C = −0.2948 | D = 0.698e + 1 |
|---|---|---|---|---|---|
| R2 | K = −0.334 | A = 0.3336e − 1 | B = 0.177e − 2 | C = −0.26e − 1 | D = 0.5084e − 2 |
| R3 | K = −0.6318 | A = −0.47e − 1 | B = 0.177e − 1 | C = 0.866e − 3 | D = −0.272e − 2 |
| R4 | K = −0.634 | A = −0.82e − 1 | B = −0.75e − 1 | C = 0.1066 | D = −0.347e − 1 |

TABLE 2

Compositional data (Embodiment 2)

| Radius of curvature (R1) | Interval (di) | Refractive index (ni) | Abbe's constant (vi) |
|---|---|---|---|
| Diaphragm 0.00 | d1 = 0.300 | | |
| R1 = −2.3255 | d2 = 1.000 | n2 = 1.492 | v2 = 57.8 |
| R2 = −1.4641 | d3 = 0.000 | | |
| Diaphragm 0.00 | d4 = 0.300 | | |
| R3 = 1.6665 | d5 = 0.800 | n5 = 1.492 | v5 = 57.8 |
| R4 = 2.1337 | d6 = 0.800 | | |
| R5 = 0.00 | d7 = 1.000 | n7 = 1.516 | Cover glass |
| R6 = 0.00 | | | |

Paraxial data

Combined focal length f = 3.293 mm
Fno (numerical aperture) = 2.8

Aspherical surface coefficients

| R1 | K = 0.8415 | A = −0.295e − 1 | B = −0.6535e − 1 | C = 0.1173 | D = −0.536e − 1 |
|---|---|---|---|---|---|
| R2 | K = 0.1186 | A = 0.3566e − 1 | B = −0.1293 | C = 0.1385 | D = −0.7014e − 1 |
| R3 | K = −0.4043e − 1 | A = 0.176e − 1 | B = −0.4755e − 2 | C = −0.8826e − 2 | D = 0.333e − 2 |
| R4 | K = 0.1593e + 1 | A = 0.5294e − 1 | B = −0.1333e − 1 | C = −0.8351e − 3 | D = −0.4133e − 2 |

TABLE 3

Compositional data (Embodiment 3)

| Radius of curvature (R1) | Interval (di) | Refractive index (ni) | Abbe's constant (vi) |
|---|---|---|---|
| Diaphragm 0.00 | d1 = 0.300 | | |
| R1 = −2.1142 | d2 = 1.000 | n2 = 1.492 | v2 = 57.8 |
| R2 = −1.110 | d3 = 0.000 | | |
| Diaphragm 0.00 | d4 = 0.300 | | |
| R3 = 1.6803 | d5 = 0.800 | n5 = 1.492 | v5 = 57.8 |
| R4 = 1.4499 | d6 = 0.800 | | |
| R5 = 0.000 | d7 = 1.000 | n7 = 1.516 | Cover glass |
| R6 = 0.000 | | | |

TABLE 3-continued

Compositional data (Embodiment 3)

Paraxial data

Combined focal length f = 2.96 mm
Fno (numerical aperture) = 2.8

Aspherical surface coefficients

| | | | | |
|---|---|---|---|---|
| R1 | K = −0.100e + 1 | A = −0.113 | B = −0.1816 | C = −0.5337 | D = 0.3025 |
| R2 | K = −0.100e + 1 | A = −0.4206e − 1 | B = −0.2084 | C = 0.2646 | D = −0.1946 |
| R3 | K = −0.100e + 1 | A = −0.1247e − 1 | B = 0.106e − 1 | C = −0.3786e − 2 | D = 0.9773e − 3 |
| R4 | K = −0.100e + 1 | A = −0.1381e − 1 | B = 0.2549e − 1 | C = −0.1705e − 1 | D = 0.5139e − 2 |

TABLE 4

Compositional data (Embodiment 4)

| Radius of curvature (R1) | Interval (di) | Refractive index (ni) | Abbe's constant (vi) |
|---|---|---|---|
| Diaphragm 0.00 | d1 = 0.184 | | |
| R1 = 5.00 | d2 = 1.400 | n2 = 1.53 | v2 = 56.0 |
| R2 = −1.66 | d3 = 0.05 | | |
| R3 = 9.54 | d4 = 0.78 | | v4 = 56.0 |
| R4 = 2.08 | d5 = 0.80 | n5 = 1.53 | |
| R5 = 0.00 | d6 = 0.50 | | Cover glass |
| R6 = 0.00 | | n6 = 1.493 | |

Paraxial data

Combined focal length f = 3.624 mm
Fno (numerical aperture) = 2.8

Aspherical surface coefficients

| | | | | |
|---|---|---|---|---|
| R1 | K = −0.399e + 2 | A = −0.347e − 1 | B = −0.136e − 1 | C = 0.198e − 3 | D = 0.195e − 1 |
| R2 | K = −0.939e − 1 | A = 0.132e − 1 | B = −0.387e − 2 | C = −0.268e − 2 | D = −0.784e − 3 |
| R3 | K = −0.313e + 1 | A = −0.653e − 2 | B = 0.224e − 2 | C = 0.123e − 3 | D = −0.881e − 3 |
| R4 | K = 0.788e − 1 | A = 0.122e − 1 | B = −0.548e − 2 | C = −0.186e − 2 | D = 0.65e − 3 |

In the respective embodiments, an imaging lens 10 may include a lens system 20 and/or a cover glass G. The lens system 20 includes a first lens L1 and a second lens L2. In the drawings, a reference character IS shows an image surface, the face numbers correspond to the respective lenses(the first lens L1 and the second lens L2), and the like (a cover glass G), counting in sequence from the subject.

Taking the face number as i, the variables in the respective diagrams and tables are as follows:
Ri: radius of curvature of face i (radius of curvature at axis in the case of aspherical surface);
di: distance from face i to face i+1
ni: refractive index of medium present at di
vi: dispersion of medium present at di.

The aspherical data is shown together with the face number in the bottommost column of Table 1, Table 2, Table 3 and Table 4.

The zero curvature of radius of the aperture diaphragm AD and rear diaphragm i.e. second diaphragm BD indicate that the radius of curvature is infinite.

The refractive index indicates the refractive index of ray d (587.56 nm), and the Abbe's constant indicates the dispersion thereof.

In the aberration charts in FIGS. 2(B) to 2(E), FIGS. 3(B) to 3(E), FIGS. 4(B) to 4(E) and FIGS. 5(B) to 5(E), reference numeral 1 relates to a wavelength of 587.56 nm, reference numeral 2 relates to a wavelength of 480.0 nm, and reference numeral 3 relates to a wavelength of 650.0 nm.

The aberration data shown in FIGS. 2(B) to 2(E) were obtained under a following condition.
Fno: 2.800, f1: 2.053 (mm), DEFOCUS: 0.000 (mm) and IMAGE HIGHT(H): 1.315 (mm), 0.920 (mm), 0.657 (mm) and 0.000 (mm).

The aberration data shown in FIGS. 3(B) to 3(E) were obtained under a following condition.
Fno: 2.805, f1: 3.293 (mm), DEFOCUS: 0.000 (mm) and IMAGE HIGHT(H): 2.250 (mm), 1.575 (mm), 1.124 (mm) and 0.000 (mm).

The aberration data shown in FIGS. 4(B) to 4(E) were obtained under a following condition.
Fno: 2.805, f1: 2.960 (mm), DEFOCUS: 0.000 (mm) and IMAGE HIGHT(H): 2.251 (mm), 1.575 (mm), 1.125 (mm) and 0.000 (mm).

The aberration data shown in FIGS. 5(B) to 5(E) were obtained under a following condition.
Fno: 2.800, f1: 3.624 (mm), DEFOCUS: 0.000 (mm) and IMAGE HIGHT(H): 2.240 (mm), 1.792 (mm), 1.344 (mm) and 0.000 (mm).

Further, FIGS. 2(B), 3(B), 4(B) and 5(B) show coma aberrations. FIGS. 2(C), 3(C), 4(C) and 5(C) show astigmatism aberrations. FIGS. 2(D), 3(D), 4(D) and 5(D) show distortion aberrations. FIGS. 2(E), 3(E), 4(E) and 5(E) show spherical aberrations.

Figure 2C:
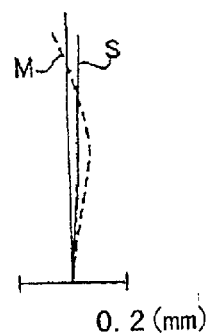
Figure 2D:
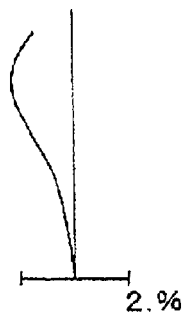
Figure 2E:
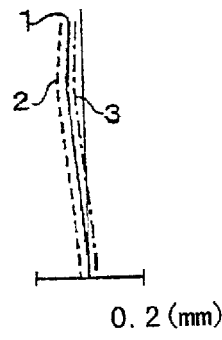

The front end of the curve indicating the astigmatism and distortion aberration in FIGS. 2(C) and 2(D) is situated 1.315 mm from the centre.

The front end of the curve indicating the astigmatism and distortion aberration in FIGS. 3(C) and 3(D) and FIGS. 4(C) and 4(D) is situated 2.25 mm from the centre.

Figure 5A:
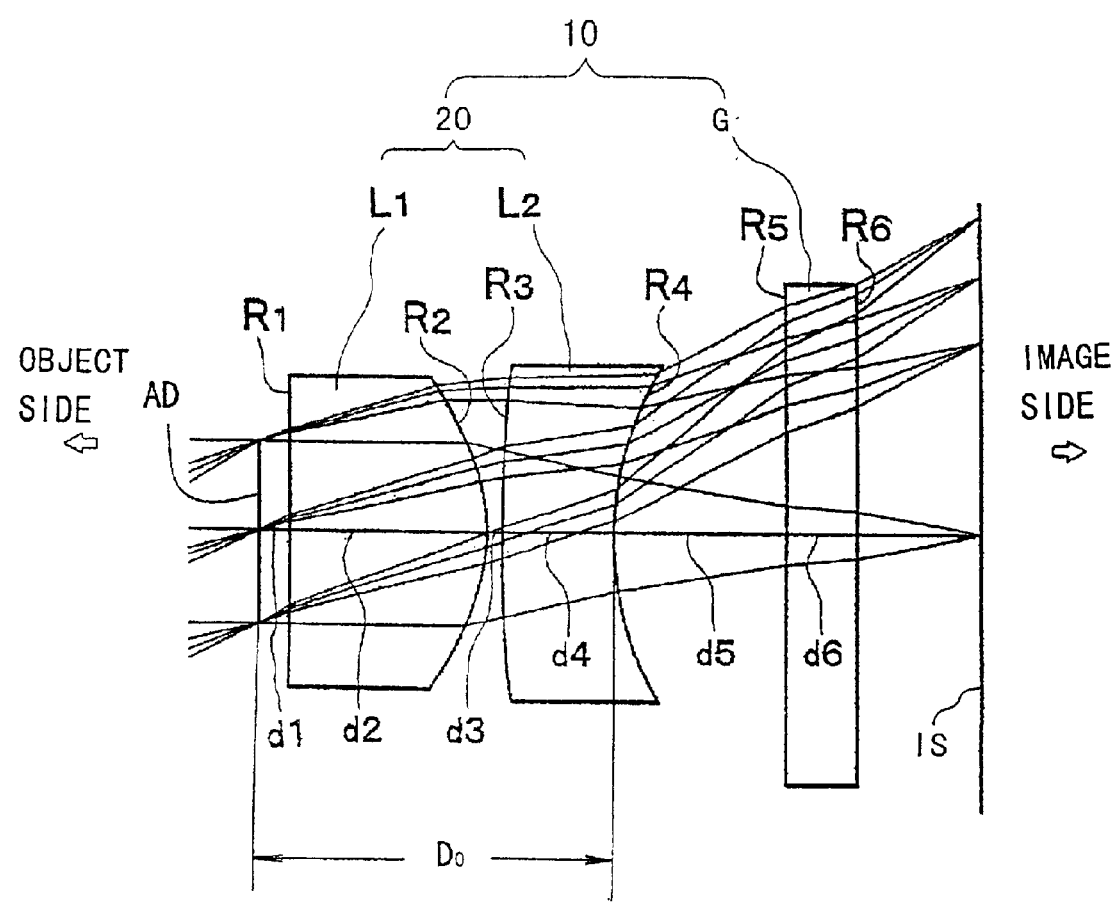
FIG. 5(A) is an optical diagram and FIGS. 5(B) to 5(E) are aberration charts showing a fourth embodiment of an imaging lens according to the present invention.
Figure 5B:
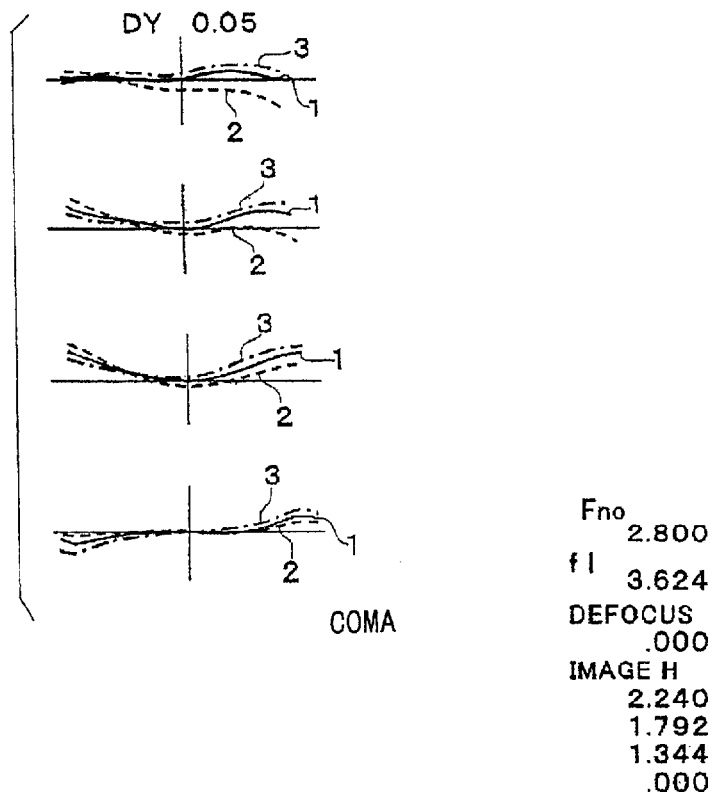
Figure 5C:
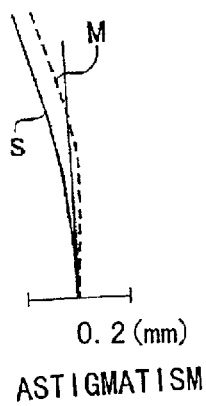
Figure 5D:
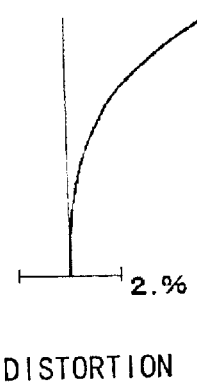
Figure 5E:
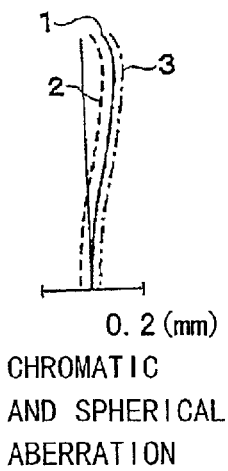

The front end of the curve indicating the astigmatism and distortion aberration in FIGS. 5(C) and 5(D) is situated 2.24 mm from the centre.

The aspherical faces used in the present invention are given by the following equation.
(Equation 1)

$$Z = ch^2 / \left[1 + (1 - (1 + K)c^2h^2)^{+1/2}\right] + Ah^4 + Bh^6 + Ch^8 + Dh^{10}, \text{ where}$$

Z: depth of face apex from contact plane
c: paraxial curvature of face
h: height from optical axis
K: conical constant
A: $4^{th}$ order aspherical coefficient
B: $6^{th}$ order aspherical coefficient
C: $8^{th}$ order aspherical coefficient
D: $10^{th}$ order aspherical coefficient In the numerical figures representing aspherical face constants in the respective tables of this application, the denomination, "e−1", for example, indicates the −1th power of 10.

Below, the characteristic features of the respective embodiments are described.

The lens according to the first embodiment, as illustrated in FIG. 2(A) and having the compositional data illustrated in Table 1, employs Zeonex (480R), which is a thermoresistant resin, for a first lens (L1) and second lens (L2). Zeonex is a trade name of Zeon Co. Ltd., and 480R is a model number.

Both faces (i.e. the first and second faces) of the first lens (L1) and both faces (i.e. the first and second faces) of the second lens (L2) are aspherical, the first lens having a positive power and the second lens having a negative power.

Combined focal length f=2.053 mm

Focal length of first lens (L1) $f_1$=2.20 mm

Focal length of second lens (L2) $f_2$=9.95 mm

Distance from face of aperture diaphragm AD to second face of second lens (total central length of lens)$D_0$=2.35 mm Radius of curvature of image side of first lens (L1) R2=−0.9533

By inserting the foregoing values into the respective equations (1) to (3) above, the following equations are obtained.

$$0.01<|f_1|/|f_2|<0.6 \rightarrow 0.01<0.22<0.6$$

$$0.3f<|R_2|<0.6f \rightarrow 0.6159<0.9533<1.2318$$

$$0.5f<D_0<1.5f \rightarrow 1.0265<2.35<3.0795$$

With the lens according to the first embodiment, the various aberration data are as indicated in FIGS. 2(B), 2(C), 2(D) and 2(E) and a good image is obtained.

Figure 3A:
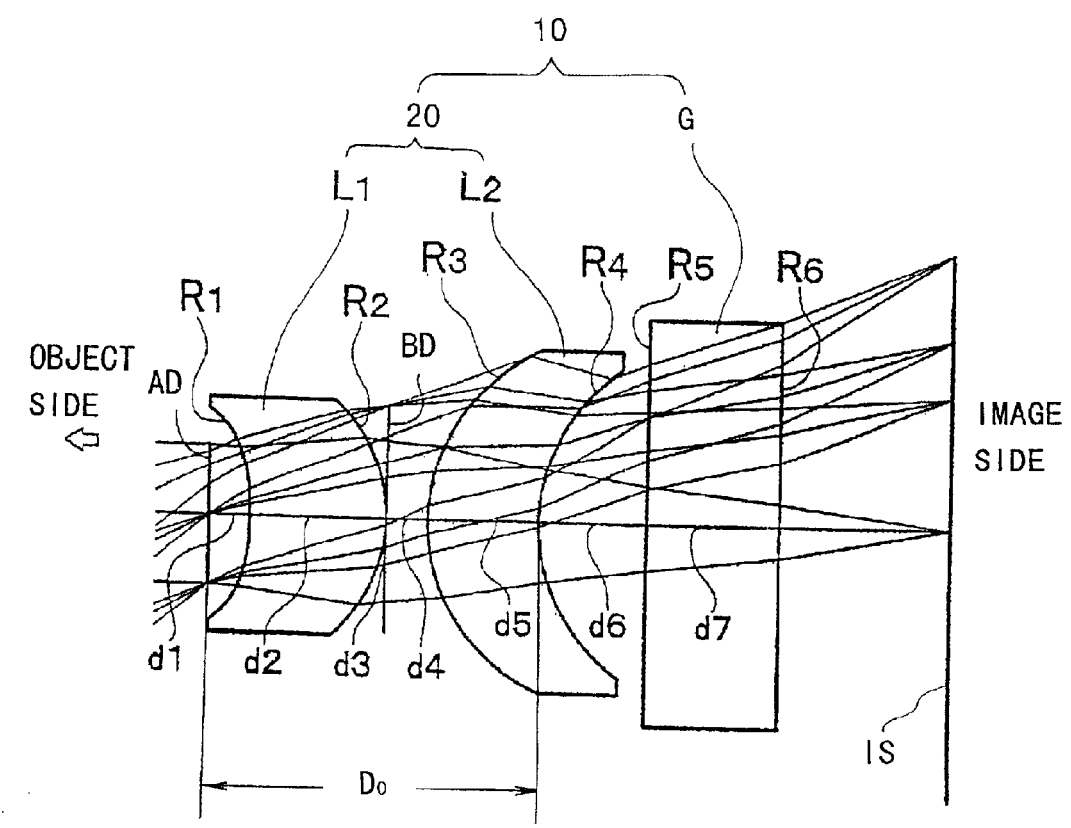
FIG. 3(A) is an optical diagram and FIGS. 3(B) to 3(E) are aberration charts showing a second embodiment of an imaging lens according to the present invention.
Figure 3B:
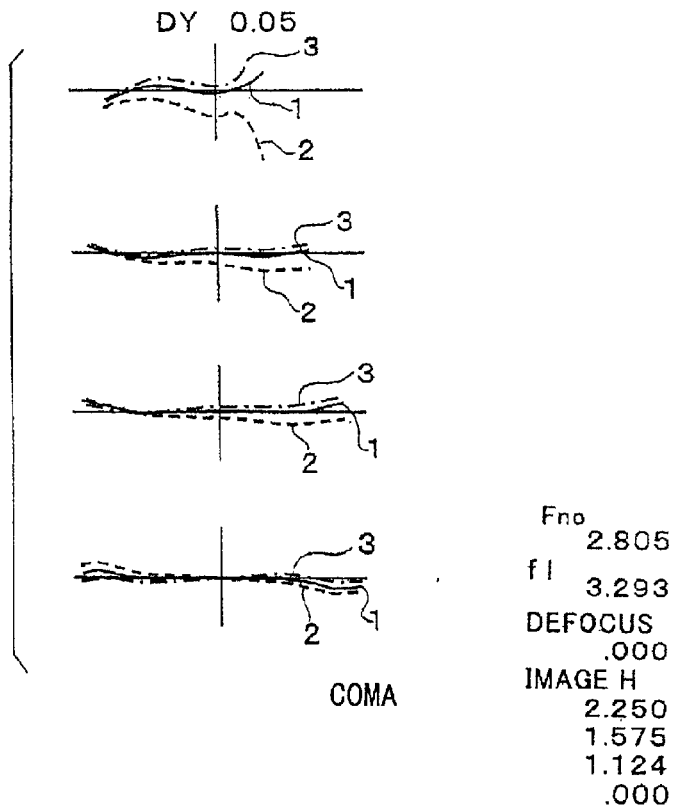
Figure 3C:
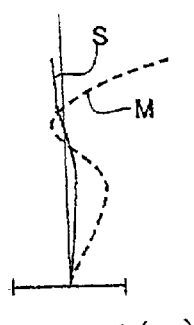
Figure 3D:
Figure 3E:
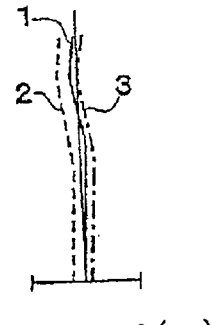

A second embodiment illustrated in FIG. 3(A) and having the compositional data shown in Table 2 employs acrylic (PMMA) for the material of the whole lens.

Both faces (i.e. the first and second faces) of the first lens (L1) and both faces (i.e. the first and second faces) of the second lens (L2) are aspherical and both the first lens and second lens have positive power.

Combined focal length f=3.293 mm

Focal length of first lens (L1) $f_1$=5.81 mm

Focal length of second lens (L2) $f_2$=9.89 mm

Distance from face of aperture diaphragm AD to second face of second lens (total central length of lens) $D_0$=2.4 mm Radius of curvature of image side of first lens (L1) R2=−1.4641 mm By inserting the foregoing values into the respective equations (1) to (3) above, the following equations are obtained.

$$0.01<|f_1|/|f_2|<0.6 \rightarrow 0.01<0.587<0.6$$

$$0.3f<|R_2|<0.6f \rightarrow 0.9879<1.4641<1.9758$$

$$0.5f<D_0<1.5f \rightarrow 1.6465<2.4<4.9395$$

With the lens according to the second embodiment, the various aberration data are as indicated in FIGS. 3(B), 3(C), 3(D) and 3(E) and a good image is obtained.

Figure 4A:
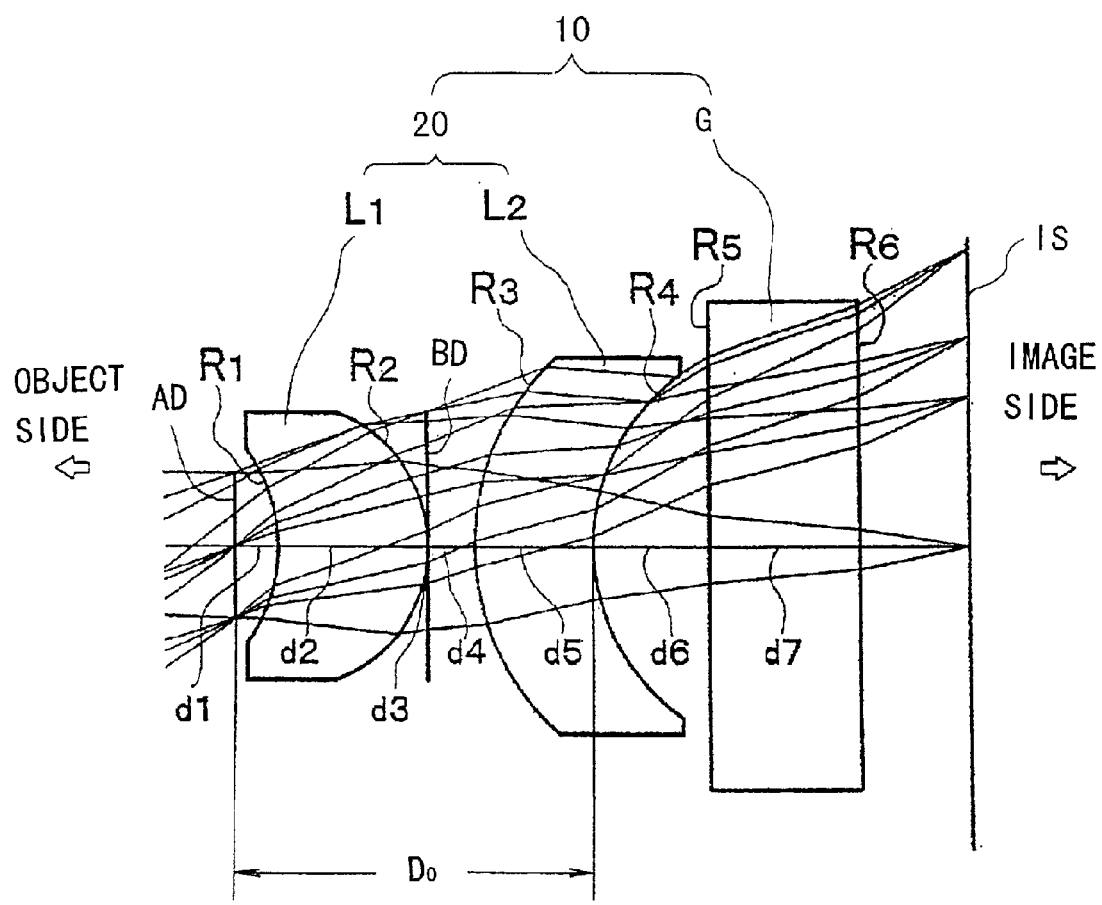
FIG. 4(A) is an optical diagram and FIGS. 4(B) to 4(E) are aberration charts showing a third embodiment of an imaging lens according to the present invention.
Figure 4B:
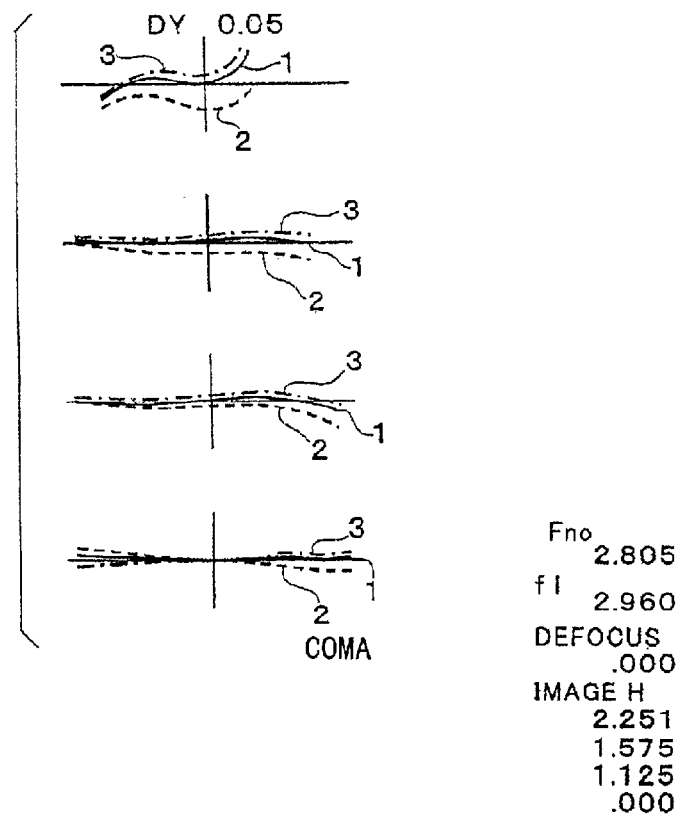
Figure 4C:
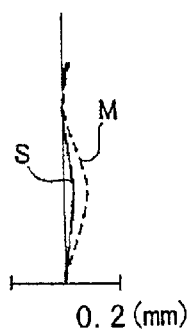
Figure 4D:
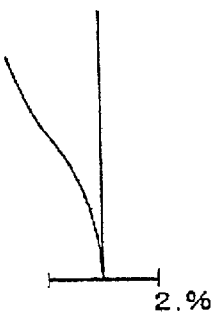
Figure 4E:
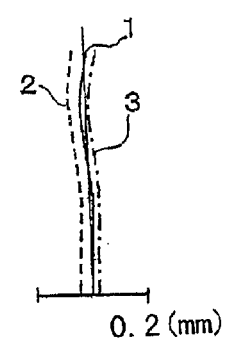

A third embodiment illustrated in FIG. 4(A) and having the compositional data shown in Table 3 employs acrylic (PMMA) as the material for the whole lens.

Both faces (i.e. the first and second faces) of the first lens (L1) and both faces (i.e. the first and second faces) of the second lens (L2) are aspherical, the first lens having a positive power and the second lens having a negative power.

Combined focal length f=2.96 mm

Focal length of first lens (L1) $f_1$=3.58 mm

Focal length of second lens (L2) $f_2$=148.46 mm

Distance from face of aperture diaphragm AD to second face of second lens (total central length of lens) $D_0$=2.4 mm Radius of curvature of image side of first lens (L1) R2=−1.11 mm By inserting the foregoing values into the respective equations (1) to (3) above, the following equations are obtained.

$$0.01<|f_1|/|f_2|<0.6 \rightarrow 0.01<0.024<0.6$$

$$0.3f<|R_2|<0.6f \rightarrow 0.888<1.11<1.776$$

$$0.5f<D_0<1.5f \rightarrow 1.48<2.4<4.44$$

With the lens according to the third embodiment, the various aberration data are as indicated in FIGS. 4(B), 4(C), 4(D) and 4(E) and a good image is obtained.

The lens according to a fourth embodiment as illustrated in FIG. 5(A) and having the compositional data shown in Table 4 employs Zeonex (E48R) as the material for the whole lens. Zeonex is a trade name of Zeon Co. Ltd., and E48R is a model number.

Both faces (i.e. the first and second faces) of the first lens (L1) and both faces (i.e. the first and second faces) of the second lens (L2) are aspherical, the first lens having a positive power and the second lens having a negative power.

Combined focal length f=3.624 mm

Focal length of first lens (L1) $f_1$=2.54 mm

Focal length of second lens (L2) $f_2$=−5.21 mm

Distance from face of aperture diaphragm AD to second face of second lens (total central length of lens)$D_0$= 2.414 mm Radius of curvature of image side of first lens (L1) R2=−1.66 mm By inserting the foregoing values into the respective equations (1) to (3) above, the following equations are obtained.

$$0.01<|f_1|/|f_2|<0.6 \rightarrow 0.01<0.488<0.6$$

$$0.3f<|R_2|<0.6f \rightarrow 1.087<1.66<2.174$$

$$0.5f<D_0<1.5f \rightarrow 1.812<2.414<5.436$$

With the lens according to the fourth embodiment, the various aberration data are as indicated in FIGS. 5(B), 5(C), 5(D) and 5(E) and a good image is obtained.

Moreover, although plastic lenses were used in all of the first to fourth embodiments, it is also possible to use so-called "molded glass" having an equivalent refractive index, for these lenses.

As described in detail above, the imaging lens according to the present invention has a simple two-group, two-lens composition, but by making positive use of plastic lenses, it is possible to achieve an extremely small lens having a short optical length and low distortion aberration, which can be used in cameras, televisions, and the like, using high-performance CMOS and CCD devices. Moreover, since the whole of the imaging lens is made from plastic material, it is possible to reduce the overall weight of the imaging lens.

What is claimed is:

1. An imaging lens comprising, in sequence from the object side to the image side: an aperture diaphragm, a first lens, a second diaphragm, and a second lens;

said first lens consisting of a meniscus-shaped lens having positive power with a concave face oriented towards the object side; and said second lens consisting of a meniscus-shaped lens with a concave face oriented towards the image side; wherein at least one face of said first lens is an aspherical face, and one or more faces of said second lens is an aspherical face, in such a manner that said imaging lens as a whole is a lens system comprising at least two aspherical faces, and satisfying each of the following condition equations (1), (2), (3)

$$0.01 < |f_1|/|f_2| < 0.6 \quad (1)$$

$$0.3f < |R_2| < 0.6 \quad (2)$$

$$0.5f < D_0 < 1.5f \quad (3)$$

where, f: a focal length of the whole lens $f_1$: focal length of first lens $f_2$: focal length of second lens $D_0$: distance from the aperture diaphragm face to the second face of second lens (total central length of lens)

$R_2$: radius of curvature of image side of first lens.

2. The imaging lens according to claim 1, wherein said first lens and second lens are both made from plastic.

3. The imaging lens according to claim 1, wherein said second lens has negative power.

4. The imaging lens according to claim 1, wherein said second lens has positive power.

5. An imaging lens comprising, in sequence from the object side to the image side: an aperture diaphragm, a first lens and a second lens;

said first lens consisting of a double convex-shaped lens having positive power with a convex face oriented towards the object side;

said second lens consisting of a meniscus-shaped lens with a concave face oriented towards the image side;

wherein at least one face of said first lens is an aspherical face, and one or more faces of said second lens is an aspherical face, in such a manner that said imaging lens as a whole is a lens system comprising at least two aspherical faces, and satisfying each of the following condition equations (1), (2), (3):

$$0.01 < |f_1|/|f_2| < 0.6 \quad (1)$$

$$0.3f < |R_2| < 0.6f \quad (2)$$

$$0.5f < D_0 < 1.5f \quad (3)$$

where, f: focal length of whole lens $f_1$: focal length of first lens $f_2$: focal length of second lens $D_0$: distance from the aperture diaphragm face to the second face of second lens (total central length of lens)

$R_2$: radius of curvature of image side of first lens.

6. The imaging lens according to claim 5, wherein said first lens and second lens are both made from plastic.

7. The imaging lens according to claim 5, wherein said second lens has negative power.

8. The imaging lens according to claim 5, wherein said second lens has positive power.

* * * * *